United States Patent
Choi et al.

(10) Patent No.: US 7,853,720 B2
(45) Date of Patent: Dec. 14, 2010

(54) METHOD FOR DOMAIN NAME SYSTEM SPOOFING IN LOCAL NETWORK SYSTEM

(75) Inventors: Hyung-Suk Choi, Songnam-shi (KR); Bo-Gu Lee, Suwon-shi (KR); Yong-Moon Won, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2221 days.

(21) Appl. No.: 10/419,100

(22) Filed: Apr. 21, 2003

(65) Prior Publication Data
US 2003/0200335 A1    Oct. 23, 2003

(30) Foreign Application Priority Data
Apr. 22, 2002    (KR) .................. 10-2002-0022058

(51) Int. Cl.
*G06F 15/16*    (2006.01)
(52) U.S. Cl. .................. 709/245; 709/223; 709/224; 709/225; 709/227
(58) Field of Classification Search .............. 709/245, 709/203, 217, 219, 227, 216, 223, 224, 225, 709/238
See application file for complete search history.

(56) References Cited

U.S. PATENT DOCUMENTS

| | | | | |
|---|---|---|---|---|
| 6,324,585 B1 * | 11/2001 | Zhang et al. | ................ | 709/245 |
| 6,480,508 B1 * | 11/2002 | Mwikalo et al. | ............ | 370/475 |
| 7,024,199 B1 * | 4/2006 | Massie et al. | ............... | 455/445 |
| 7,133,404 B1 * | 11/2006 | Alkhatib et al. | ............. | 370/392 |
| 2002/0138649 A1 * | 9/2002 | Cartmell et al. | ............. | 709/245 |
| 2002/0152311 A1 * | 10/2002 | Veltman et al. | ............. | 709/227 |
| 2002/0188757 A1 * | 12/2002 | Yoon et al. | .................. | 709/245 |
| 2003/0009592 A1 * | 1/2003 | Stahura | ...................... | 709/245 |
| 2003/0172183 A1 * | 9/2003 | Anderson et al. | ........... | 709/245 |
| 2004/0015584 A1 * | 1/2004 | Cartmell et al. | ............. | 709/225 |

* cited by examiner

*Primary Examiner*—Barbara N Burgess
(74) *Attorney, Agent, or Firm*—H.C. Park & Associates, PLC (57) ABSTRACT

A method and system can access local network access devices whose IP (Internet Protocol) addresses are not registered to a DNS (Domain Name System) server using domain names. For this, a local network gateway registers the IP addresses and the domain names mapped to the IP addresses thereto. If a domain name contained in a received DNS query packet is registered to the local network gateway, the local network gateway changes a DNS query packet into a DNS answer packet containing an IP address corresponding to the registered domain name and then transmits the DNS answer packet to a local personal computer. Otherwise, the local network gateway passes the DNS query packet to an external network as it is.

7 Claims, 7 Drawing Sheets

METHOD FOR DOMAIN NAME SYSTEM SPOOFING IN LOCAL NETWORK SYSTEM

CLAIM OF PRIORITY

This application makes reference to, incorporates the same herein, and claims all benefits accruing under 35 U.S.C §119 from an application entitled METHOD FOR SPOOFING DOMAIN NAME SYSTEM IN LOCAL NETWORK AND LOCAL NETWORK SYSTEM THEREOF earlier filed in the Korean Industrial Property Office on Apr. 22, 2002, and there duly assigned Serial No. 2002-22058 by that Office.

BACKGROUND OF THE INVENTION

1. Field of the Invention

The present invention relates to a local network interworking with an IP (Internet Protocol) network, and more particularly to a method and network for allowing a local network access device to access local network devices to which IP addresses are assigned.

2. Description of the Related Art

Conventionally, a local network includes a local network gateway and interworks with an Internet being the IP network. Further, the local network includes a plurality of local network access devices and a PC (Personal Computer), which is connected to the Internet through the local network gateway for accessing the local network access devices. Conventionally, the PC, the local network gateway and the local network access devices are interconnected by an Ethernet interface.

For example, the local network can be a home network where a user of the PC accesses the Internet using ADSL (Asymmetrical Digital Subscriber Line) services, and the local network gateway corresponds to an ADSL modem. As is well known to those in the art, an ISP (Internet Service Provider), not shown, connects the PC to the Internet. Further, each local network access device has an IP address. For example, the local network access devices can include a television, a refrigerator, a washing machine, etc., which are accessed by the PC.

As a system for managing domain names on the Internet, a DNS (Domain Name System), is employed. The DNS maps and registers a domain name of a host computer and an IP address in a DNS server so that the user of the PC can connect the PC to a desired host computer through the Internet by inputting the domain name, in place of the IP address that the user may not remember.

In order to use DNS services, the domain name is to be registered to the DNS server. However, it is difficult for domain names of all the local devices to be registered to the DNS server. Further, costs needed to register the domain names are expensive. Therefore, where the user of the PC accesses the local network access devices corresponding to IP addresses not to be registered to the DNS server from the local network through a Web, a telnet (Telecommunication Network), a FTP (File Transfer Protocol), a ping (Packet Internet Grouper), etc., the respective IP addresses corresponding to the local network access devices should be directly inputted by the user. If the user desires to access a local network access device corresponding to an IP address "192.168.82.1" using the telnet, the user should input "telnet 192.168.82.1".

Accordingly, there is a problem in that a user should directly input IP addresses to access local network devices corresponding to IP addresses not to be registered to a DNS server from a local network. There is another problem in that the user should remember the IP addresses corresponding to the local network devices or store the IP addresses and domain names in a Windows™ host file. There is yet another problem in that the user should remember changed IP addresses where the IP addresses corresponding to the local network devices are changed.

SUMMARY OF THE INVENTION

Therefore, the present invention has been made in view of the above problems, and it is an object of the present invention to provide a method and local network system capable of accessing local network devices corresponding to IP addresses, not to be registered to a DNS (Domain Name System) server, using domain names in a local network.

In accordance with an aspect of the present invention, a local network gateway registers IP addresses and domain names mapped to the IP addresses thereto. If the domain name contained in a received DNS query packet is registered to the local network gateway, the local network gateway changes a DNS query packet into a DNS answer packet containing an IP address mapped to the registered domain name and then transmits the DNS answer packet to a local network access device. Otherwise, the local network gateway passes the DNS query packet to another network as it is.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

Figure 1:
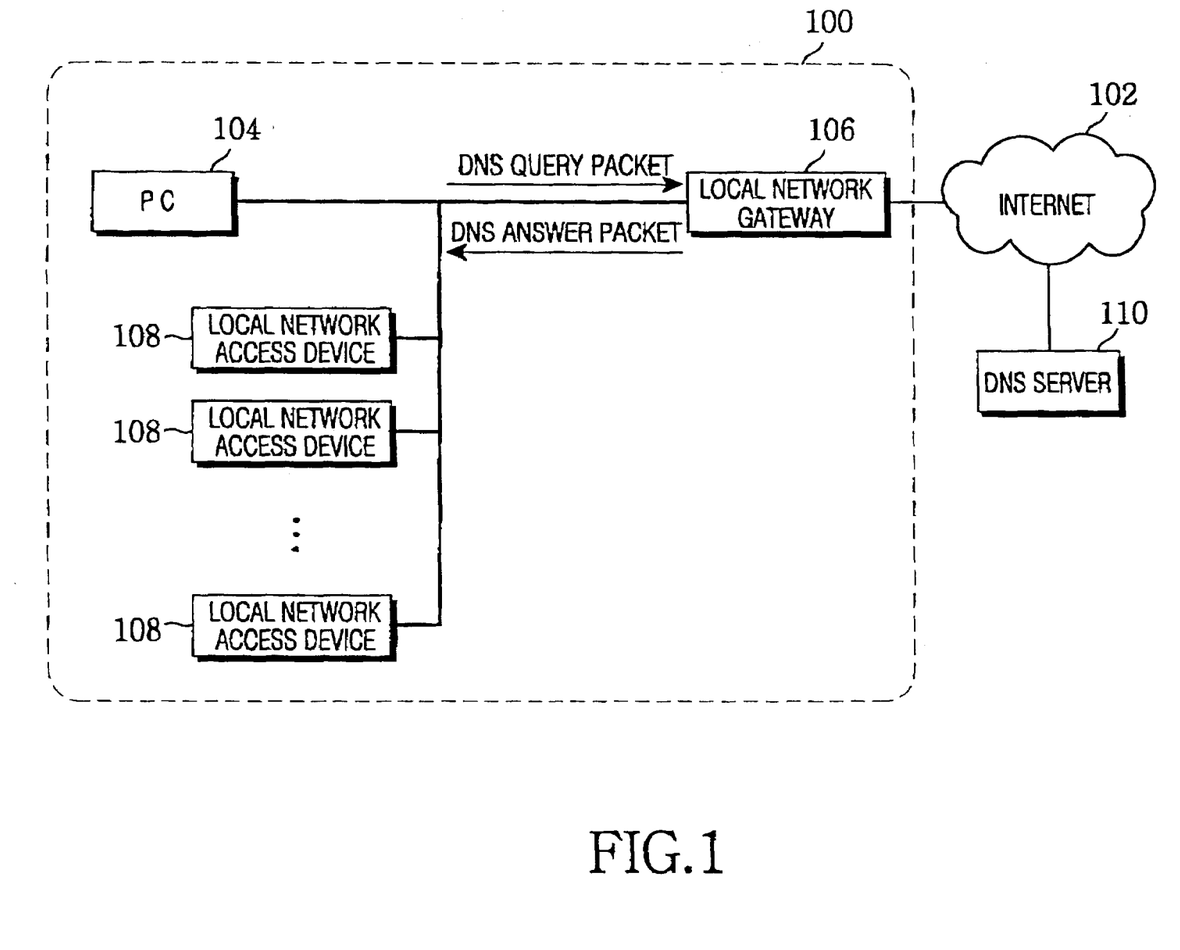
FIG. 1 is a view showing a configuration of a local network as employed in the present invention.

A local network interworks with an IP (Internet Protocol) network and includes local network devices to which IP addresses are assigned as shown in FIG. 1. A local network 100 shown in FIG. 1 includes a local network gateway 106 and interworks with an Internet 102 being the IP network. Further, the local network 100 includes a plurality of local network access devices 108 and a PC (Personal Computer) 104, which is connected to the Internet 102 through the local network gateway 106 for accessing the local network access devices 108. The PC 104, the local network gateway 106 and the local network access devices 108 are interconnected by an Ethernet interface.

As a system for managing domain names on the Internet 102, a DNS (Domain Name System), is employed. The DNS maps and registers a domain name of a host computer and an IP address in a DNS server 110 shown in FIG. 1 so that the user of the PC 104 can connect the PC 104 to a desired host computer through the Internet 102 by inputting the domain name, in place of the IP address that the user may not remember.

Figure 2:
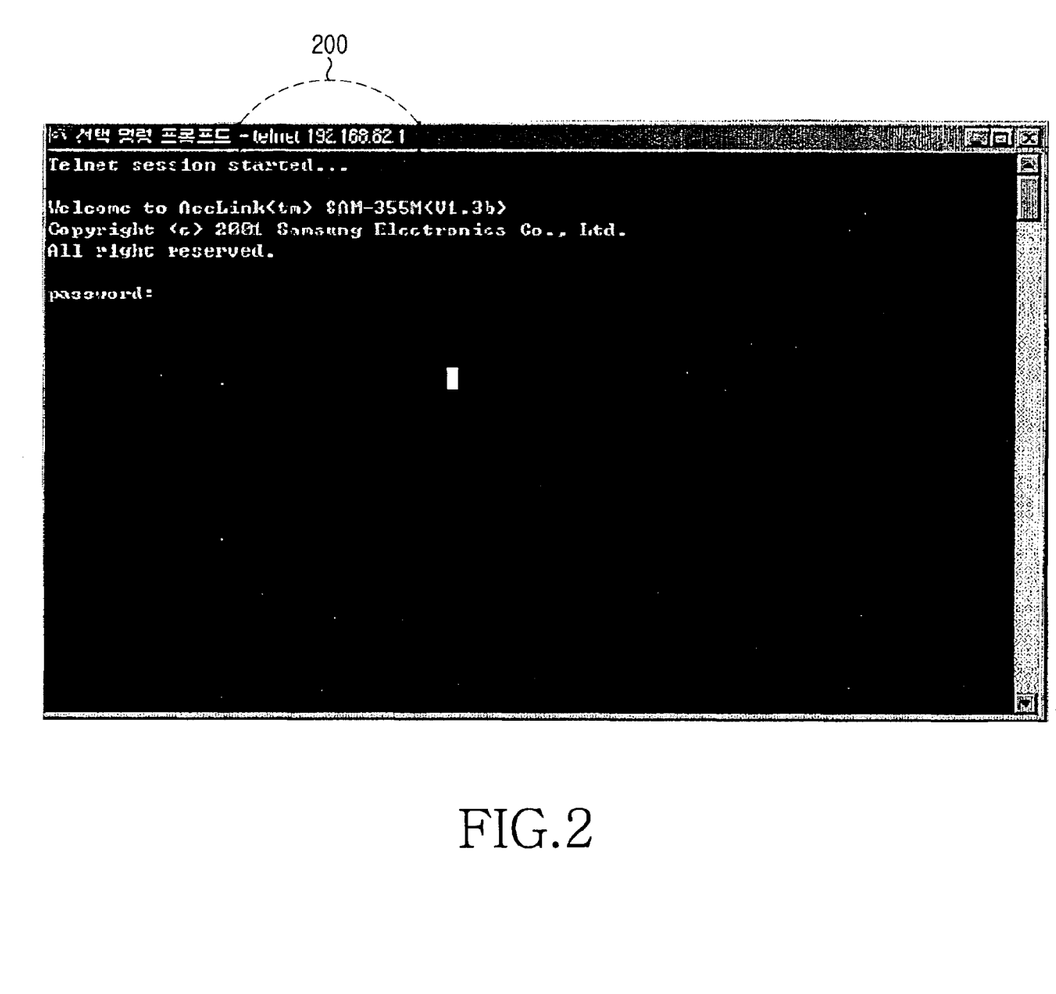
FIG. 2 is an exemplary view showing a display screen according to a conventional telnet use.

In order to use DNS services, the domain name is to be registered to the DNS server 110. However, it is difficult for domain names of all the local network access devices 108 to be registered to the DNS server 110. Further, costs needed to register the domain names are expensive. Therefore, where the user of the PC 104 accesses the local network access devices 108 corresponding to IP addresses not to be registered to the DNS server 110 from the local network 100 through a Web, a telnet (Telecommunication Network), a FTP (File Transfer Protocol), a ping (Packet Internet Grouper), etc., the respective IP addresses corresponding to the local network access devices 108 should be directly inputted by the user. If the user desires to access a local network access device 108 corresponding to an IP address "192.168.82.1" using the telnet, the user should input "telnet 192.168.82.1" as indicated at a reference numeral 200 contained in a display screen shown in FIG. 2.

If the user of the PC 104 inputs a domain name of a local network access device 108 whose IP address is not registered to the DNS server 110 or inputs on the Internet 102 a domain name of the host computer whose IP address is registered to the DNS server 110, the PC 104 transmits a DNS query packet containing the domain name inputted by the user. All DNS query packets to be transmitted by the PC 104 go via the local network gateway 106.

Examples of specified domain names corresponding to IP addresses assigned to the local network access devices 108, which are not registered to the DNS server 110 shown in FIG. 1, are designated below. If a user inputs a designated domain name in place of an IP address, the user can access a corresponding local network access device 108. For this, domain names and IP addresses are registered to the local network gateway 106 as shown in Table 1. In Table 1, each IP address is mapped to each domain name designated to each local network access device 108.

TABLE 1

| Local Network Device | IP Address | Domain Name |
| --- | --- | --- |
| 1 | 192.168.82.1 | web.console1 |
| 2 | 192.168.82.2 | web.console2 |
| . | . | . |
| . | . | . |
| . | . | . |
| N | 192.168.82.N | web.consoleN |

Figure 3:
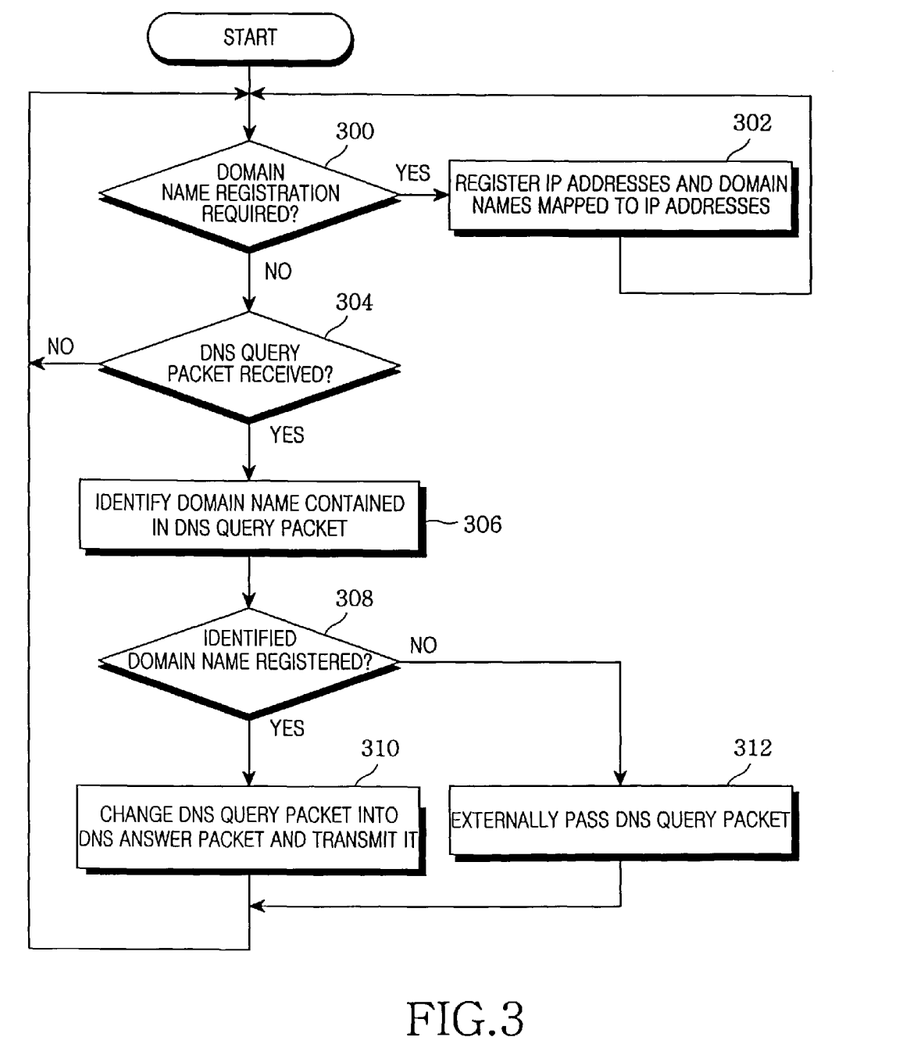
FIG. 3 is a flow chart showing a process of a local network gateway in accordance with an embodiment of the present invention.

In accordance with an embodiment of the present invention, a flow chart describing a process of the local network gateway 106 is made up of steps 300-312 shown in FIG. 3. As shown in FIG. 3, the local network gateway 106 designates specific domain names corresponding to IP addresses assigned to the local network access devices 108, which are not registered to the DNS server 110.

In step 300, if the user inputs an IP address and a domain name of a local network device 108, using PC 104, the local network gateway 106 determines whether the IP address and domain name are to be registered, if so the local network gateway 106 registers the IP address and maps the domain name to the registered address at step 302.

If the local network gateway 106 receives a DNS query packet from the PC 104 at step 304, a domain name contained in the received DNS query packet is identified at step 306. The local network gateway 106 determines at step 308 whether the domain name contained in the received DNS query packet is registered in the above-described Table 1. If the domain name is not registered in the above-described Table 1, the local network gateway 106 passes the DNS query packet to an external IP network, i.e., the Internet 102 shown in FIG. 1. The DNS query packet is then transmitted to the DNS server 110 through the Internet 102. If an IP address corresponding to the domain name contained in the DNS query packet is registered, the DNS server 110 transmits a DNS answer message containing the IP addresses back to the PC 104.

On the other hand, if the domain name contained in the DNS query packet is registered to the local network gateway 106, the local network gateway 106 changes the DNS query packet into a DNS answer packet containing the IP address corresponding to the domain name and transmits it to the PC 104 at step 310.

Where the domain name contained in the DNS query packet is registered in the local network gateway 106, a process of changing the DNS query packet to the DNS answer packet will be described below with reference to FIGS. 5-10.

Figure 5:
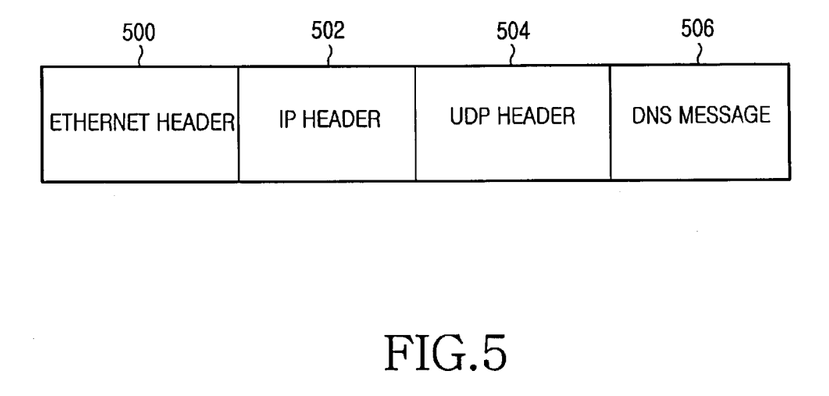
FIG. 5 is a view showing a DNS (Domain Name System) packet format.

First, the DNS packet comprises an Ethernet header 500, an IP header 502, a UDP (User Datagram Protocol) header 504 and a DNS message 506 as shown in FIG. 5. The Ethernet header 500, the IP header 502 and the UDP header 504 are needed to transmit the DNS message 506 from a source to a destination. Further, the DNS message 506 includes query and answer fields. The query field contains a domain name corresponding to an IP address to be acquired. The answer field contains the acquired IP address corresponding to the domain name.

Figure 6:
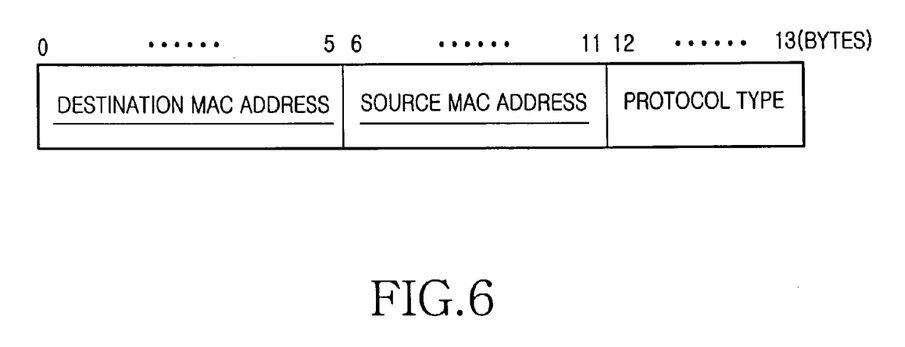
FIG. 6 is a view showing an Ethernet header format of FIG. 5.

A format of the Ethernet header 500 is shown in FIG. 6. The Ethernet header 500 has corrected sections in order to change the DNS query packet into the DNS answer packet. The corrected sections are a "destination MAC (Media Access Control) address" and a "source MAC address" indicated with underlines. Destination and source MAC addresses of the DNS query packet are changed into the source and destination MAC addresses to be configured in the DNS answer packet, respectively.

Figure 7:
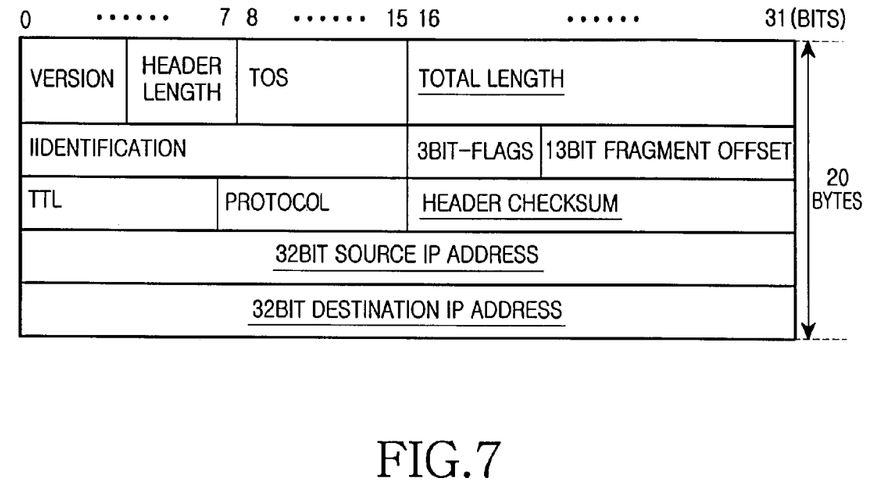
FIG. 7 is a view showing an IP (Internet Protocol) header format of FIG. 5.

A format of the IP header 502 is shown in FIG. 7. The IP header 502 has corrected sections in order to change the DNS query packet into the DNS answer packet. The corrected sections are a "total length", a "header checksum", a "32-bit source IP address" and a "32-bit destination IP address" indicated with underlines. The total length of the DNS answer packet is a sum of a total length of the DNS query packet and a DNS answer length. The header checksum composed of 16 bits is obtained by a checksum function based on the DNS answer packet. Further, 32-bit source and destination IP addresses of the DNS query packet are changed into the 32-bit destination and source IP addresses to be configured in the DNS answer packet, respectively.

Figure 8:
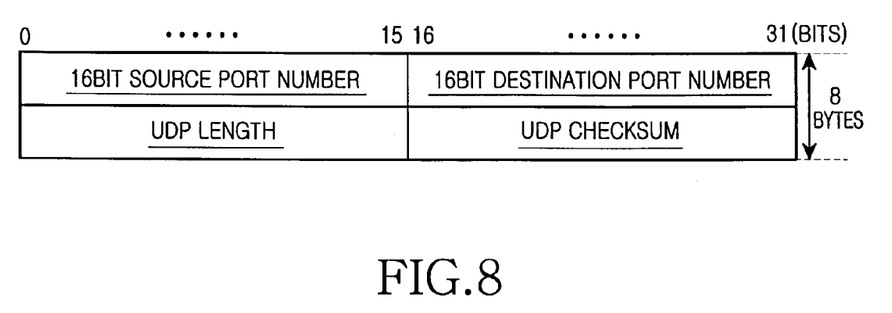
FIG. 8 is a view showing a UDP (User Datagram Protocol) header format of FIG. 5.

A format of the UDP header 504 is shown in FIG. 8. The UDP header 504 has corrected sections in order to change the DNS query packet into the DNS answer packet. The corrected sections are a "16-bit source port number", a "16-bit destination port number", a "UDP length" and a "UDP checksum" indicated with underlines. Sixteen-bit source and destination port numbers of the DNS query packet are changed into the 16-bit destination and source port numbers to be configured in the DNS answer packet, respectively. The UDP length is a sum of a query UDP length and a DNS answer length. The UDP checksum is obtained by a checksum function based on the DNS answer packet.

Figure 9:
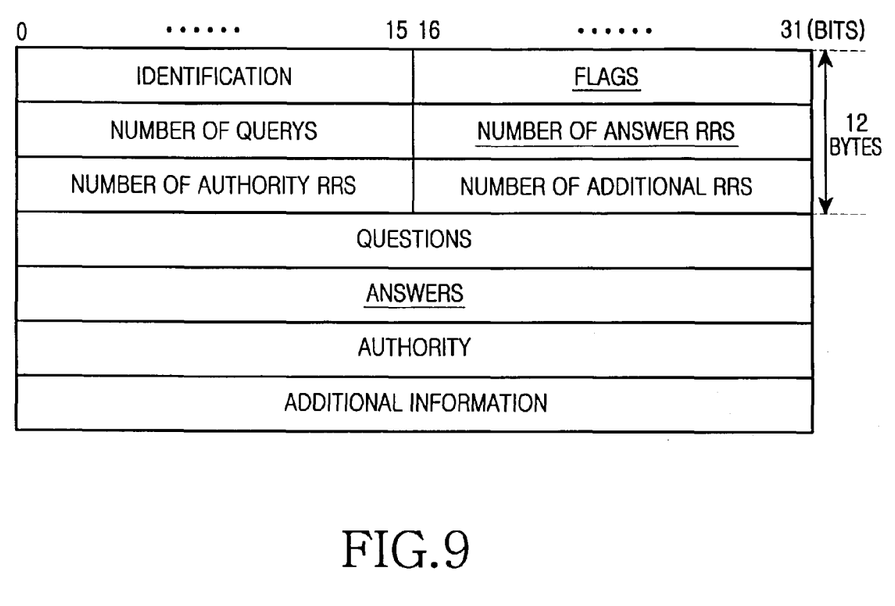
FIG. 9 is a view showing a DNS message format of FIG. 5.
Figure 10:
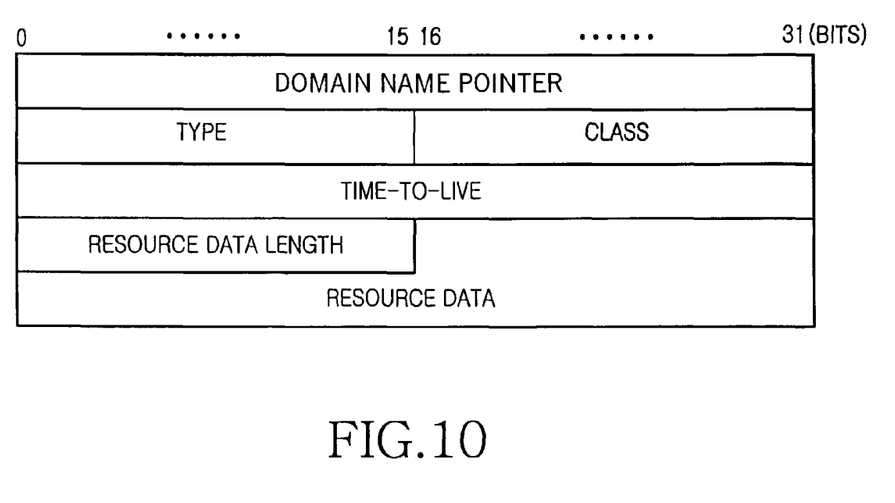
FIG. 10 is a view showing an answer field format of the DNS message of FIG. 9.

A format of the DNS message is shown in FIG. 9. The DNS message has corrected sections in order to change the DNS query packet into the DNS answer packet. The corrected sections are "flags", the "number of answer RRs" and "answers" indicated with underlines. Flags in the DNS query packet indicate a value "0x01 0x00", while the flags in the DNS answer packet indicate a value "0x81 0x80". The number of answer RRs in the DNS query packet indicates a value "0x00 0x00", while the number of answer RRs in the DNS answer packet indicates a value "0x00 0x01". As shown in FIG. 10, the answers corresponding to an answer field optionally include "domain name pointer"=c0 0c, "type"=0x00 0x01, "class"=0x00 0x01, "TTL"=0x00 0x00 0x00 0x80, "resource data length"=0x00 0x04 and "resource data"=IP.

Referring back to FIG. 1, when a user inputs a domain name the PC 104 transmits a DNS query packet to query an IP address for a local network access device 108 whose IP address is not registered to the DNS server 110, but is instead registered in local network gateway 106. The PC 104 then receives a DNS answer packet containing the IP address corresponding to a domain name contained in the DNS query packet from the local network gateway 106.

Figure 4:
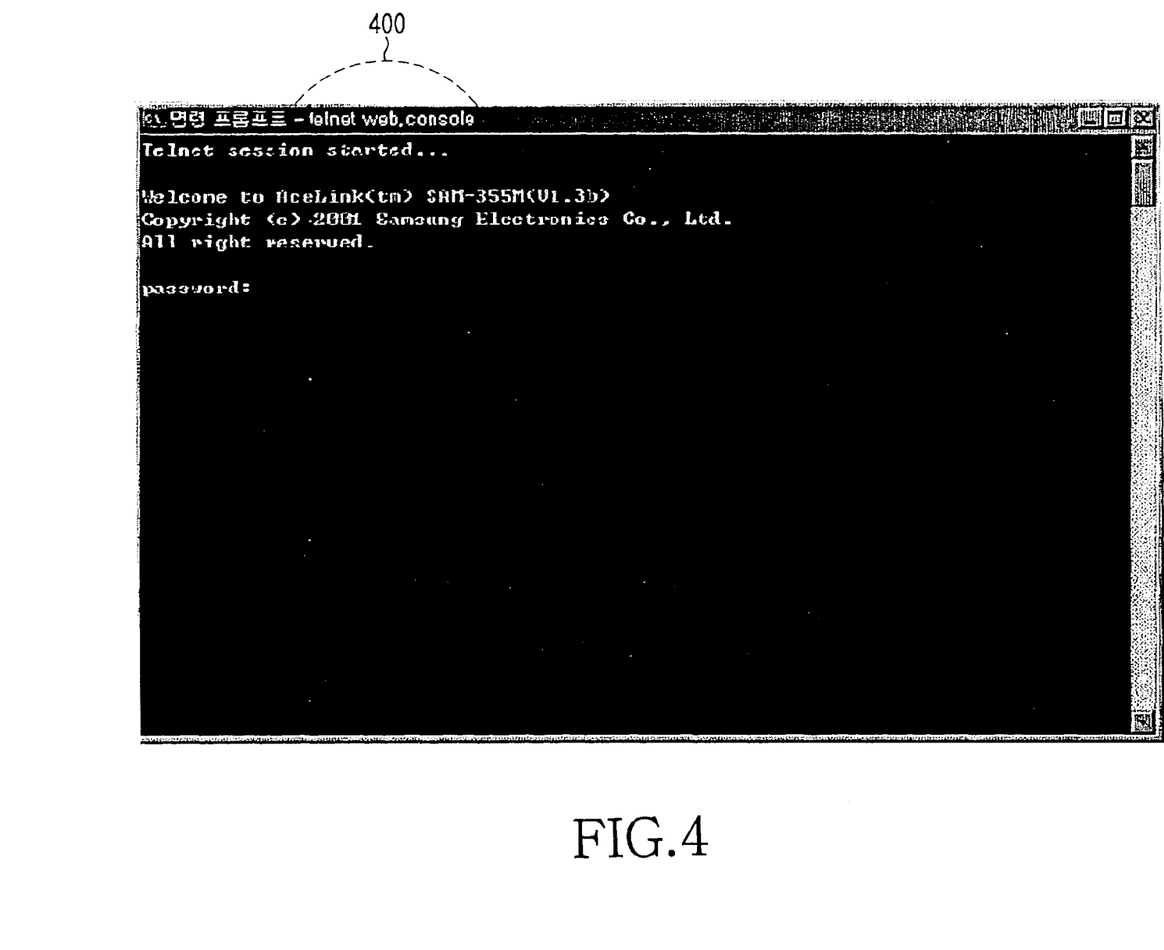
FIG. 4 is an exemplary view showing a display screen according to a telnet use in accordance with an embodiment of the present invention.

Accordingly, the user of the PC 104 can communicate with the local network access device 108 using only the domain name. In other words, although the IP address of the local network access device 108 is not registered to the DNS server 110, the PC 104 can use the DNS spoofing services of local network gateway 106. For example, if the user of the PC 104 desires to access a local network access device 108 whose domain name is designated as "web.console" using the telnet, the user can access the local network access device 108 by inputting only "telnet web.console" as indicated at a reference numeral 400 contained in a display screen shown in FIG. 4, instead of an IP address.

Because the IP address of the local network access device 108 is registered to the local DNS spoofing services of the local network gateway 106, it affects only the local network access device 108 and shall not affect an external network such as the Internet 102. In other words, because the local network gateway 106 externally passes the DNS query packet where the domain name does not correspond to one of the local network access devices 108 and transmits the DNS answer packet to the PC 104 only where the domain name corresponds to the one of the local network access devices 108, it does not affect the external network.

Accordingly, DNS spoofing can be performed with respect to the local network access devices 108 whose IP addresses are not registered to the DNS server 110. The local network access devices 108 can communicate with each other using the domain name without using the DNS server 110, for which costs are incurred, and affecting the external network. Further, because the user does not have to remember IP addresses of the local network access devices 108, the convenience for accessing the local network access devices 108 is improved.

It can be considered that a DNS server be implemented within the local network gateway 106 of the local network 100, instead of the DNS spoofing described above. However, a size of an image is not appropriate for supporting such a DNS server in an ADSL modem used, for example, as the local network gateway 106.

The local network gateway 106 does not need all functions of a DNS server. The local network gateway 106 only converts the domain names of the local network access devices 108 into the IP addresses. Where the DNS server is implemented to convert a small number of domain names to the IP addresses, it is not effective, and also the performance of the local network gateway 106 is deteriorated. In other words, the local network gateway 106 is an embedded system for implementing an optimum performance using a small amount of resources.

It is not appropriate to implement the DNS server, continuously occupying the resources and exchanging data with another DNS server to perform data update, within the local network gateway 106. Although a DNS server could be implemented within the local network gateway 106, any domain name or IP address cannot be used because the DNS server exchanges the data with another DNS server in the local network 100. If any domain name or IP address is used in the local network 100, this can cause a problem because of affecting DNS servers similar to the DNS server 110. To prevent the problem, the user cannot help paying a fee to use a certified domain name or IP address.

However, if a DNS function is implemented for specific domain names using the DNS spoofing method in accordance with the present invention, it can be implemented for the local network access devices 108 using a small code size. Because the local network gateway 106 acts as the DNS server from a PC 104 side point of view, but is not actually a DNS server functioning according to FIGS. 5-10, any registered domain name input by the user of PC 104 is not transmitted to an external DNS server 110 in the DNS spoofing. Any domain name or IP address not to be certified can be used in the local network 100. Although the local network gateway 106 monitors domain names and performs DNS spoofing only where the DNS query packet containing the domain name is registered in the local network gateway 106, no problem in performance is caused because an operation according to a very short code is carried out to produce a result.

If the DNS server is implemented within the local network 100, a desired domain name or IP address cannot be used before it is certified. In other words, if the domain name "web.console" does not belong to a format of a domain name distributed from an NIC (Network Information Center), it cannot be used. However, in accordance with the DNS spoofing of the present invention, any domain name or IP address can be used within the local network 100.

As apparent from the above description, the present invention can perform DNS spoofing so that local network devices can communicate with each other using the domain name without using a DNS server, for which costs are incurred, and affecting an external network, although IP addresses of the local network access devices are not registered to the DNS server. Further, because the user does not have to remember IP addresses of the local network access devices, the convenience for accessing the local network devices can be improved.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A method for accessing a local network access device on the basis of a DNS (Domain Name System) in a local network, the local network comprising at least one local network access device, a local computer for accessing the local network access device and a local network gateway for providing the local computer with access to another network, the method comprising:

registering an IP (Internet Protocol) address assigned to the at least one local network access device and a domain name mapped to the IP address in the local network gateway;

identifying, by the local network gateway, whether a domain name in a received DNS query packet is registered to the local network gateway if the DNS query packet is received from the local computer; and if the domain name in the received DNS query packet is not registered to the local network gateway, passing the DNS query packet to another network as the DNS query packet is, and, if the domain name in the received DNS query packet is registered to the local network gateway, changing the DNS query packet into a DNS answer packet comprising an IP address mapped to the registered domain name corresponding to the at least one local network access device and then transmitting the DNS answer packet to the local computer, wherein the DNS query packet and the DNS answer packet comprise a DNS message comprising flags set in a first state for the DNS query packet and in a second state for the DNS answer packet, wherein the DNS query packet and the DNS answer packet each comprise an Ethernet header, an IP header, a User Datagram Protocol (UDP) header, and a DNS message.

2. The method as set forth in claim 1, wherein the local network comprises a home network.

3. An apparatus configured to be connected to at least one local network access device to which an IP (Internet Protocol) address is assigned and configured to be connected to a personal computer connected to the at least one local network access device accessing at least one local network, the personal computer being configured to generate a DNS (Domain Name System) query packet comprising a domain name, the apparatus comprising:

a local network gateway connected to the personal computer and the at least one local network access device and configured to register the IP address of the at least one local network access device and a corresponding domain name mapped to the IP address, the local network gateway configured to receive the DNS query packet from the personal computer, wherein if the domain name in the received DNS query packet is not registered to the local network gateway, the local network gateway passes the DNS query packet to another network as the DNS query packet is, and, wherein if the domain name in the received DNS query packet is registered to the local network gateway, the local network gateway changes the DNS query packet into a DNS answer packet comprising an IP address mapped to the registered domain name corresponding to the at least one local network access device and then transmits the DNS answer packet to the personal computer, wherein the DNS query packet and the DNS answer packet comprises a DNS message comprising flags set in a first state for the DNS query packet and in a second state for the DNS answer packet, wherein the DNS query packet and the DNS answer packet each comprise an Ethernet header, an IP header, a User Datagram Protocol (UDP) header, and a DNS message.

4. The apparatus of claim 3, wherein the local network gateway comprises a table comprising the IP address of the at least one local network access device and the corresponding domain name mapped to the IP address.

5. The apparatus of claim 3, wherein the at least one local network comprises a home network.

6. A method for accessing a local network device on the basis of a domain name and an IP (Internet Protocol) address assigned to said local network device of a local network, the local network comprising at least one said local network device, a local computer for accessing the local network device and a local network gateway for providing the local computer with access to the local network device or an external network, the method comprising:

generating a DNS (Domain Name System) query packet in response to user input of a domain name via said local computer, said DNS query packet comprising said domain name;

transmitting said DNS query packet to said local network gateway;

determining, by said local network gateway, whether said domain name in said DNS query packet is registered in said local network gateway and corresponds to the domain name assigned to said local network device;

passing the DNS query packet from said local network gateway to said external network, when said domain name in the DNS query packet is not registered in the local network gateway and does not correspond to the domain name assigned to said local network device; and changing the DNS query packet into a DNS answer packet comprising said IP address assigned to said local network device corresponding to said domain name and then transmitting the DNS answer packet from said local network gateway to said local computer, when said domain name in the DNS query packet is registered in the local network gateway and does correspond to the domain name assigned to said local network device, wherein the DNS query packet and the DNS answer packet comprises a DNS message comprising flags set in a first state for the DNS query packet and in a second state for the DNS answer packet, wherein the DNS query packet and the DNS answer packet each comprise an Ethernet header, an IP header, a User Datagram Protocol (UDP) header, and a DNS message.

7. The method as set forth in claim 6, further comprising:
detecting user input of an IP address and the domain name of the local network device via said local computer;
determining whether the input IP address and the domain name, when detected, are to be registered locally; and
registering said IP address and the domain name in the local network gateway.

* * * * *